(12) United States Patent
Ascencio Rios et al.

(10) Patent No.: US 10,810,580 B2
(45) Date of Patent: Oct. 20, 2020

(54) VIRTUAL PAYMENT ACCOUNT

(71) Applicant: INTERNATIONAL BUSINESS MACHINES CORPORATION, Armonk, NY (US)

(72) Inventors: Sergio E. Ascencio Rios, Zapopan (MX); Natalie N. Brooks Powell, Bolingbrook, IL (US); Yuk L. Chan, Rochester, NY (US); Apurv R. Johar, Dublin, CA (US); Heidi Lagares-Greenblatt, Jefferson Hills, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 640 days.

(21) Appl. No.: 15/286,052

(22) Filed: Oct. 5, 2016

(65) Prior Publication Data
US 2018/0096343 A1 Apr. 5, 2018

(51) Int. Cl.
*G06Q 40/00* (2012.01)
*G06Q 20/34* (2012.01)
(Continued)

(52) U.S. Cl.
CPC .......... *G06Q 20/351* (2013.01); *G06Q 30/02* (2013.01); *G06Q 30/0207* (2013.01); *G06Q 30/06* (2013.01)

(58) Field of Classification Search
CPC ... G06Q 20/351; G06Q 30/02; G06Q 30/0207
See application file for complete search history.

(56) References Cited

U.S. PATENT DOCUMENTS

| | | | |
|---|---|---|---|
| 6,542,872 B1 * | 4/2003 | Skubic | G06F 3/0482 705/16 |
| 7,006,983 B1 * | 2/2006 | Packes, Jr. | G06Q 30/02 705/14.34 |

(Continued)

FOREIGN PATENT DOCUMENTS

| | | | | |
|---|---|---|---|---|
| CA | 2915375 | * | 6/2016 | G06Q 20/24 |
| WO | WO-2004042626 A2 | * | 5/2004 | G06Q 30/04 |

OTHER PUBLICATIONS

Garner et al., "Card-based Macropayment for Mobile Phones," Proceedings of the International Conference on Mobile Business, IEEE, (Year: 2006).*

(Continued)

*Primary Examiner* — Alexander G Kalinowski
*Assistant Examiner* — William B. Bunker
(74) *Attorney, Agent, or Firm* — Cantor Colburn LLP; Teddi Maranzano (57) ABSTRACT

A computer-implemented method for an electronic funds transfer, the method including obtaining, using a processor system of a device, a virtual payment account associated with a merchant. The virtual payment account also being associated with a consumer account wherein an electronic payment medium issuer is a third party providing commercial funding on behalf of a consumer. Marketing information relating to the merchant associated with the virtual payment account is obtained. An electronic funds transfer is conducted utilizing an electronic payment medium signature associated with the electronic payment medium provided by the virtual payment account interfacing with an electronic terminal associated with the merchant. The virtual payment account and consumer account with information relating to the electronic funds transfer are updated.

18 Claims, 5 Drawing Sheets

(51) Int. Cl.
*G06Q 30/02* (2012.01)
*G06Q 30/06* (2012.01)

(56) References Cited

U.S. PATENT DOCUMENTS

| | | | |
|---|---|---|---|
| 8,799,089 B1 | 8/2014 | Gonzalez Loyo | |
| 2007/0288372 A1* | 12/2007 | Behar | G06Q 30/02 705/14.27 |
| 2008/0103968 A1* | 5/2008 | Bies | G06Q 20/06 705/39 |
| 2010/0185505 A1* | 7/2010 | Sprogoe | G06Q 30/0235 705/14.27 |
| 2011/0153437 A1* | 6/2011 | Archer | G06Q 20/3278 705/17 |
| 2012/0084132 A1* | 4/2012 | Khan | G06Q 20/3278 705/14.26 |
| 2012/0221391 A1* | 8/2012 | Wolf | G06O 30/02 705/14.17 |
| 2012/0271692 A1* | 10/2012 | Huang | G06Q 30/06 705/14.23 |
| 2013/0073404 A1 | 3/2013 | Narendra et al. | |
| 2013/0181045 A1* | 7/2013 | Dessert | G06Q 30/0601 235/383 |
| 2013/0268438 A1* | 10/2013 | Boyle | G06Q 20/381 705/44 |
| 2013/0339165 A1 | 12/2013 | Calman et al. | |
| 2014/0067514 A1* | 3/2014 | Vitti | G06Q 30/0236 705/14.36 |
| 2014/0100973 A1 | 4/2014 | Brown et al. | |
| 2014/0278905 A1 | 9/2014 | Denardis et al. | |
| 2015/0006270 A1 | 1/2015 | Xu et al. | |
| 2015/0012425 A1 | 1/2015 | Mathew et al. | |
| 2015/0142657 A1 | 5/2015 | Sagastiverza et al. | |
| 2015/0199657 A1 | 7/2015 | Castinado et al. | |
| 2015/0248665 A1* | 9/2015 | Walz | G06Q 30/0257 705/14.27 |
| 2015/0262291 A1* | 9/2015 | West | G06Q 40/025 705/14.66 |
| 2015/0286995 A1 | 10/2015 | Korosec | |
| 2016/0110707 A1* | 4/2016 | Nack | G06Q 20/3224 705/38 |
| 2017/0161728 A1* | 6/2017 | Satyanarayan | G06Q 30/0238 |
| 2018/0096337 A1 | 4/2018 | Ascencio Rios et al. | |
| 2018/0096343 A1 | 4/2018 | Ascencio Rios et al. | |
| 2018/0096344 A1 | 4/2018 | Ascencio Rios et al. | |

OTHER PUBLICATIONS

List of IBM Patents or Patent Applications Treated as Related; (Appendix P), Filed May 8, 2019; 2 pages.
N.A., "Press Releases: MasterCard Introduces MasterPass—The Future of Digital Payments", Business Wire, 2013, pp. 1-4.
Ascencio Rios et al., "Virtual Payment Account", U.S. Appl. No. 15/282,063, filed Oct. 5, 2016.
Sergio E. Ascencio Rios et al., "Virtual Payment Account", U.S. Appl. No. 15/286,052, filed Oct. 5, 2016.

* cited by examiner

VIRTUAL PAYMENT ACCOUNT

BACKGROUND

Many commercial transactions utilize an electronic funds transfer of money from one account directly to another without paper money being utilized. Consumers may possess multiple mediums for engaging in an electronic funds transfer. For instance, the use of a credit or debit card as a medium for utilizing an electronic terminal to complete a purchase is one of the most common instances of an electronic funds transfer. Some businesses issue their own merchant credit card offering incentives to use the card when purchasing items at the business. However, many businesses lack the financial ability to issue their own credit cards. Consequently, these businesses may lose business to competitors who have issued their own credit card. Accordingly enabling businesses to participate in electronic funds transfer with a simulated merchant credit card is desired.

SUMMARY

In accordance with one or more embodiments, a computer-implemented method for an electronic funds transfer, the method including obtaining, using a processor system of a device, a virtual payment account associated with a merchant. The virtual payment account also being associated with a consumer account wherein an electronic payment medium issuer is a third party providing commercial funding on behalf of a consumer. Marketing information relating to the merchant associated with the virtual payment account is obtained. An electronic funds transfer is conducted utilizing an electronic payment medium signature associated with the electronic payment medium provided by the virtual payment account interfacing with an electronic terminal associated with the merchant. The virtual payment account and consumer account are updated with information relating to the electronic funds transfer.

In accordance with one or more embodiments, a system for an electronic funds transfer involving the purchase of items or services is provided. The system includes a memory comprising computer readable instructions; and a processing device for executing the computer readable instructions. The computer readable instructions cause the processing device to perform a method which includes obtaining a virtual payment account associated with a merchant, the virtual payment account being associated with a consumer account wherein an electronic payment medium issuer is a third party providing commercial funding on behalf of a consumer and also obtaining marketing information relating to the merchant associated with the virtual payment account, conducting an electronic funds transfer utilizing an electronic payment medium signature associated with the electronic payment medium provided by the virtual payment account interfacing with an electronic terminal associated with the merchant and updating the virtual payment account and consumer account with information relating to the electronic funds transfer.

In accordance with one or more embodiments, a computer program product for an electronic funds transfer is provided wherein the computer program product includes a computer readable storage medium having program instructions embodied therewith, wherein the computer readable storage medium is not a transitory signal per se, the program instructions being readable by a processing circuit to cause the processing circuit to perform a method which includes obtaining, using a processor system of a device, a virtual payment account associated with a merchant. The virtual payment account also being associated with a consumer account wherein an electronic payment medium issuer is a third party providing commercial funding on behalf of a consumer. Marketing information relating to the merchant associated with the virtual payment account is obtained. An electronic funds transfer is conducted utilizing an electronic payment medium signature associated with the electronic payment medium provided by the virtual payment account interfacing with an electronic terminal associated with the merchant. The virtual payment account and consumer account are updated with information relating to the electronic funds transfer.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the present disclosure include systems, computer program products, and method for conducting an electronic funds transfer utilizing a virtual payment account. Electronic funds transfer occur when a consumer purchases an item utilizing an electronic payment medium which initiates the transfer of funds from the bank account of the consumer or lender of credit to a bank account of a merchant. Such common electronic fund transfers include the use of credit and debit cards as well as utilizing non-contact and near field communication devices which interact with electronic terminals for completing the electronic funds transfer. A virtual payment account manages the electronic fund transaction between the merchant and customer and functions as an ancillary electronic payment medium with the backing of an underlying financial institution providing the credit for the electronic fund transfer transaction. The virtual payment account interacts as an intermediary between the underlying financial backing institution, the merchant and the user. In this manner, the virtual payment account can provide benefits and incentives associated with the merchant and also provide customer related data to the merchant for subsequent utilization. Overall, the virtual payment account may simulate the functionality of a merchant electronic payment medium by overlaying the functionality of a merchant electronic payment medium with the payment functionality provided by the underlying backing of a third party institution which the consumer has an associated account.

Figure 1:
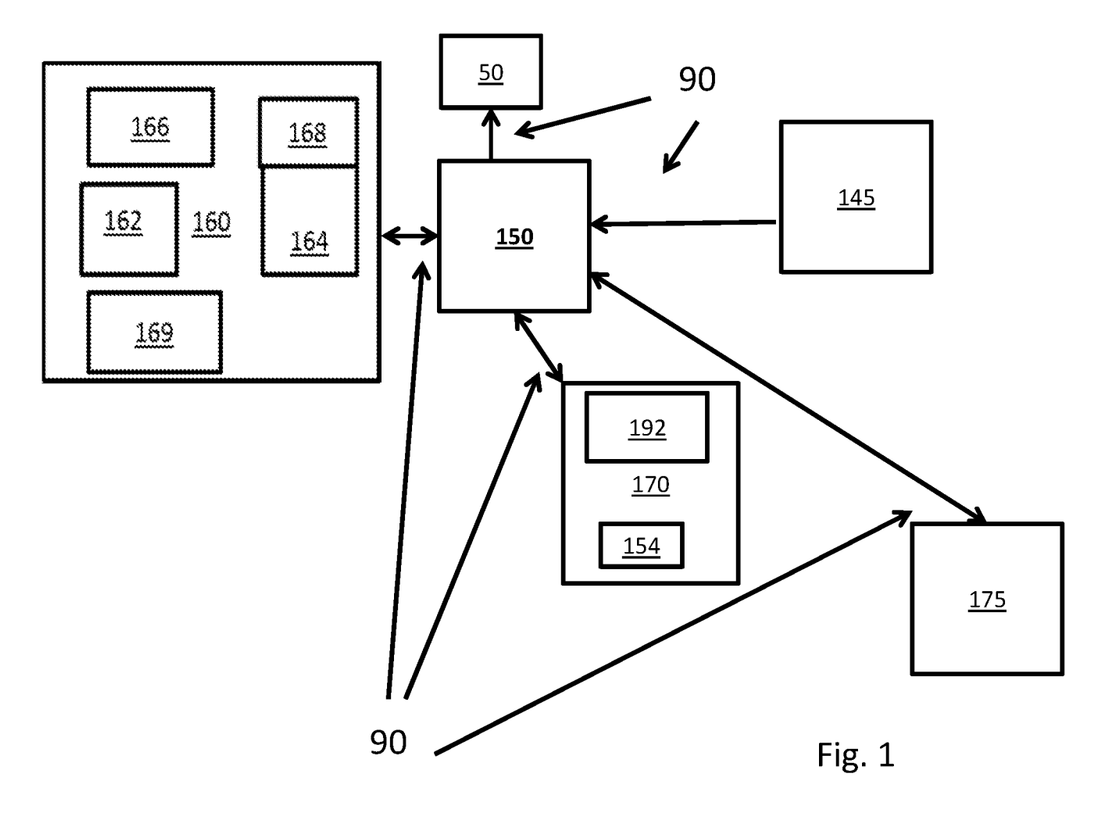
FIG. 1 illustrates a general overview of a system for conducting an electronic funds transfer utilizing a virtual payment system according to one or more embodiments.

Turning now to a more detailed description of the present disclosure, there is shown in FIG. 1, a system for conducting an electronic funds transfer utilizing the electronic funds transfer system. The system includes a user device 160 capable of engaging in the electronic funds transfer utilizing the electronic funds system. User device 160 may be any type of computing device capable of communicating electronically with a merchant capable of receiving electronic information necessary for conducting an electronic funds transfer. User device 160 may include a desktop computer, a laptop mobile computer, a personal data assistant, or a smartphone. User device 160 includes a user device memory 164 and a user device processor 162 for controlling the operation of user device 160. In an embodiment, user device 160 is a mobile device such as a smartphone and the respective memories and processors run an application for initiating the utilization of a virtual payment account for engaging in the electronic funds transfer. User device 160 includes a global positioning system (GPS) 166. An electronic communication system 168 enables user device 160 to communicate with external devices such as third party payment management system 170 and merchant electronic terminal 50 via a communications network 90. User device 160 may include a microphone 169 for recording audio voice commands for initiating the virtual payment.

As shown in FIG. 1, the system for conducting an electronic funds transfer includes virtual payment account 150 and merchant host site 145. Virtual payment account 150 may be stored in memory of user device 160 or stored and accessed from a virtual payment account host site. Virtual payment account 150 acts as an intermediary between third party payment management system 170 which provides electronic payment medium 154 for the electronic funds transaction and the merchant via electronic terminal 50. Virtual payment account 150 functions as an overlay electronic fund management system which manages the electronic fund transaction between the consumer and the merchant. The consumer utilizes the virtual payment account to facilitate payment for goods or services while the merchant interfaces with the virtual payment account in a manner which functions as a store credit card. Both the user and the merchant may interact in some manner with the virtual payment account.

In an embodiment, virtual payment account 150 is managed by the merchant and offered by the merchant for utilization by a consumer in conducting business with the respective merchant. For example, an individual merchant may not be able to offer a merchant backed credit medium such as a credit card. However, by utilizing the financial backing of a third party financial institution utilizing third party payment management system 170 in the back end of operations, the merchant may utilize the virtual payment account in the front end interfacing with the consumer. In this example, the virtual payment account functions as a store issued credit card affording the merchant the ability to offer incentives to the consumer enticing the consumer to select this merchant to engage in commercial transactions. For instance, a group of small merchants such as a local hairdresser, local dry cleaner, and local restaurant may pool themselves together and offer a virtual payment account which combines the merchants as a single commercial entity offering credit card services to a consumer by associating the virtual payment account with a third party institution. The consumer authorizes the virtual payment account to utilize a consumer account established with the third party institution for tendering payment for the electronic transfer transaction. When a consumer engages in a commercial transaction with these merchants, the consumer will initiate the virtual payment account associated with the particular merchants for conducting the electronic transfer transaction. To the consumer, they are utilizing an electronic payment medium which appears and functions as a merchant issued electronic payment medium but utilizes the authorized consumer account affiliated with the third party institution.

As shown in FIG. 1, merchant site 145 may interact with the virtual payment account 150. Merchant site 145 may be a WAN or other network system associated with the merchant and may include a specialized messaging system transmitting information relating to incentives for making a purchase such as special sales for the day or other purchasing incentive information including discounts for purchases utilizing the virtual payment account associated with the merchant. For instance, when shopping at the respective merchant, utilizing their virtual payment account for completing the commercial transaction may result in ten percent of the sales price being discounted to the consumer. Additionally, virtual payment account 150 may interact with third party host site 175 for receiving information relating to consumer transactions. For instance, if the consumer is purchasing tires, the virtual payment account may access the manufacturing host site for the tires to determine if any sales promotions or discounts could be applied to the transaction.

As shown in FIG. 1, third party payment management system 170 includes a rules database 192 containing rules which are established by the consumer in managing the utilization of the underlying credit provided by the third party credit issuer. Rules may include maximum spending limits, types of items available for purchase, the time period for allowed purchases, or other limiting parameters.

Figure 2:
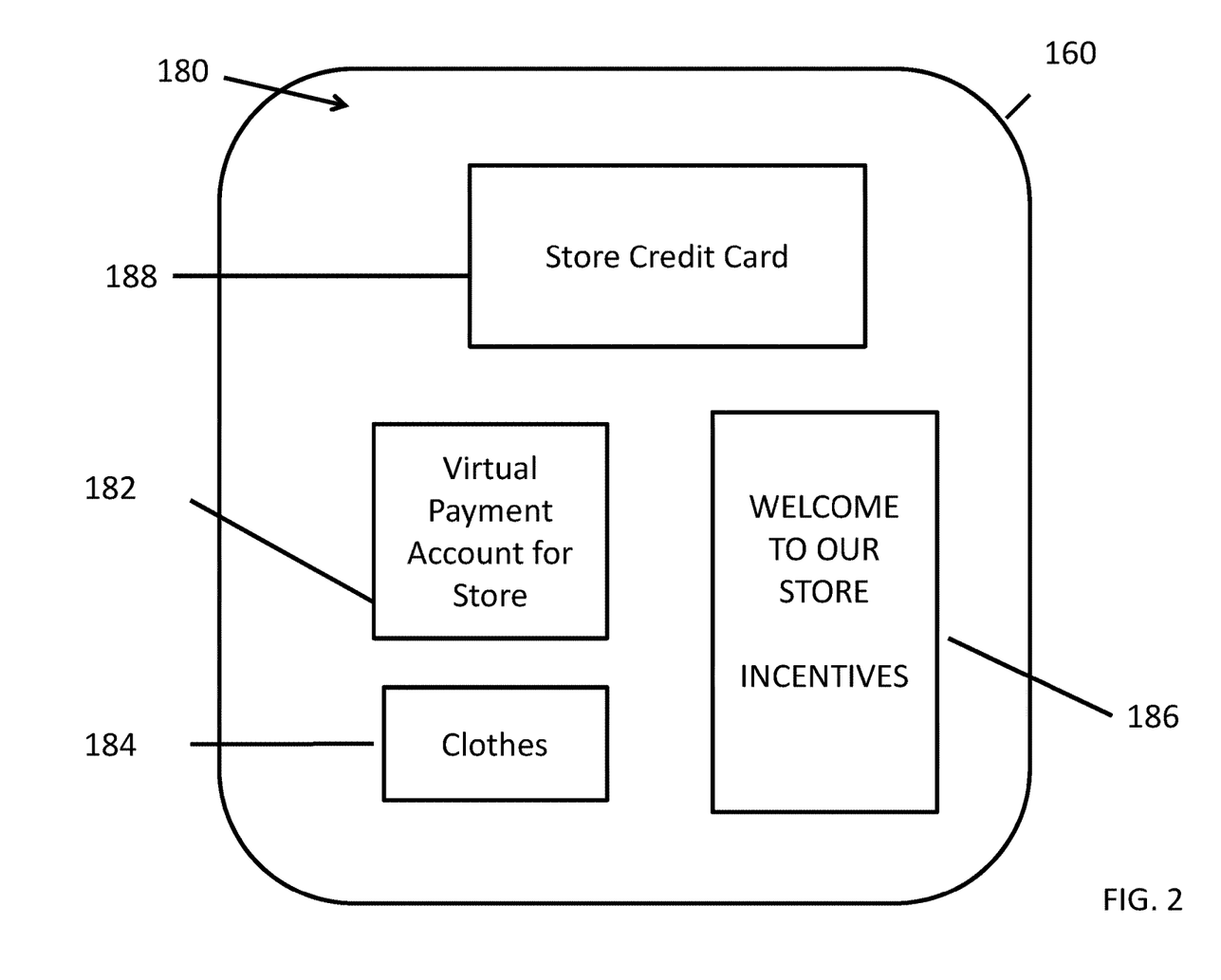
FIG. 2 illustrates a device for conducting an electronic funds transfer utilizing a virtual payment system according to one or more embodiments.

As shown in FIG. 2, device 160 includes a display 180 for displaying information to the user. Display 180 may include a virtual payment input key 182 for initiating the respective application to initiate instructions relating to utilizing a virtual payment account associated with a merchant. Device 160 may include an input area 184 for inputting information related to the transaction including the price of items which are the subject to the electronic funds transfer, the identity of the items, the manufacturer of the items, and other information specific to the electronic funds transfer. Device 160 also provides electronic payment medium signature 188 relating to the electronic payment medium 154 associated with the virtual payment account for the particular merchant for engaging in an electronic funds transfer. Electronic payment medium signature 188 interacts with merchant electronic terminal 50. Electronic payment medium signature may interact with merchant electronic terminal 50 via near field communication technology, or contactless technology utilizing a RFID device, a QR code, a barcode, Bluetooth, or other technology wherein the information is electronically communicated without physical contact. Device 160 may also include an area for displaying special messages from the merchant 186. For example, when the virtual payment account is activated, a virtual payment account application run by the processor of device 160 transfers the display into a dedicated display interacting with the merchant's host site 145 enabling the merchant to communicate with the consumer and offer various informational items enticing the consumer to engage in a commercial activity with the merchant. The ability of the virtual payment account to communicate incentives and other relevant information to the consumer entices and rewards the consumer to establish a virtual payment account with the particular merchant. Although the electronic payment medium utilized for the transaction is provided by a third party lending institution, the merchant is able to interface with the consumer in a manner wherein the electronic payment medium is associated with the merchant.

Figure 3:
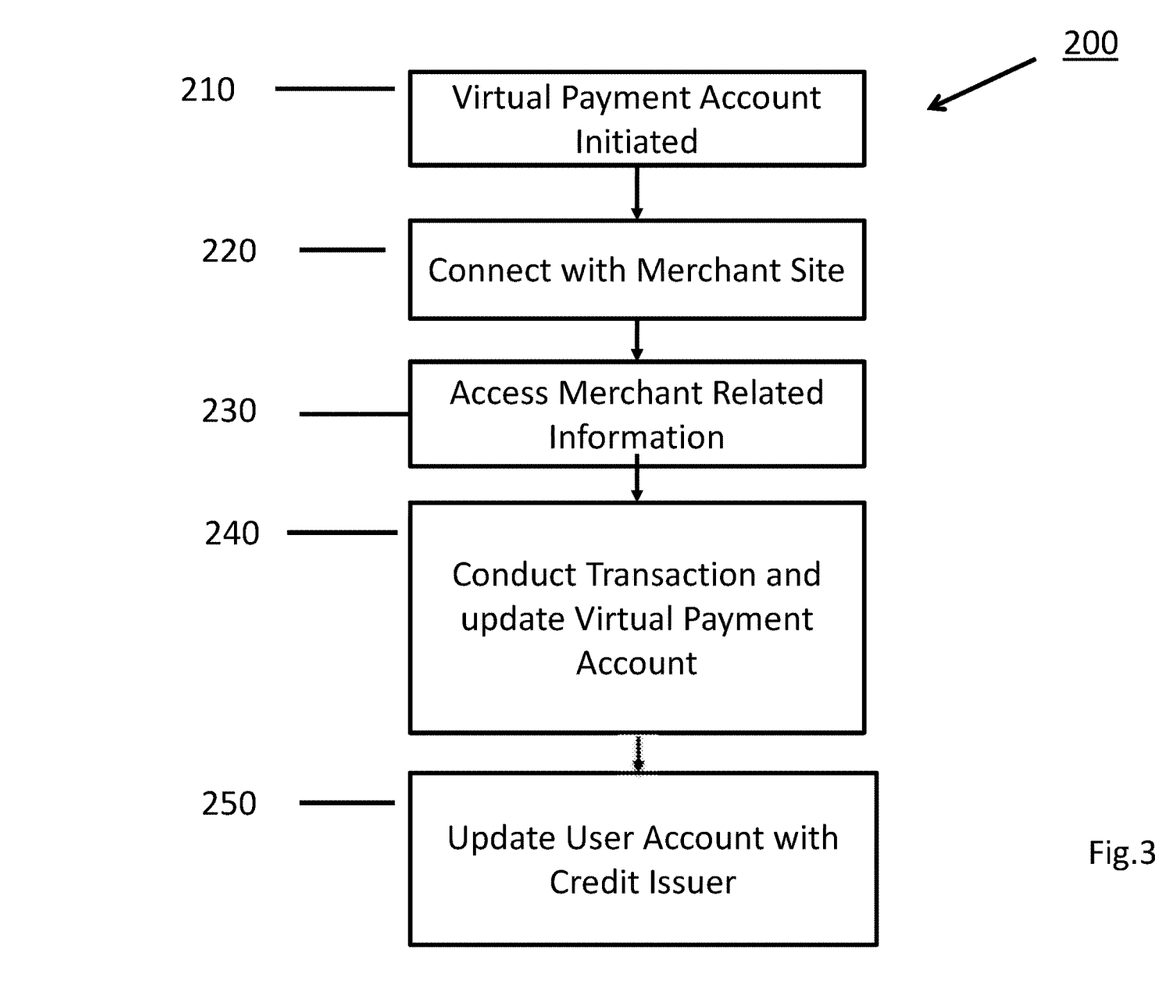
FIG. 3 illustrates a flow chart of a system for conducting an electronic funds transfer utilizing a virtual payment system according to one or more embodiments.

According to one embodiment, as shown in FIG. 3, a user may utilize device 160 for an electronic funds transfer utilizing a virtual payment mode 200. A user may activate the device for the virtual payment mode at block 210 for a respective virtual payment account associated with a particular merchant. Additionally, the location of the transaction and the identity of the merchant may be identified. If a virtual payment account for the merchant exists on the user device, the virtual payment account may automatically become active or connect with the merchant's host site. The virtual payment account specific to the merchant will have an associated third-party credit lender backing the virtual payment account. An electronic payment medium signature for tendering payment via the third party credit lender is stored in the user device's memory. In the virtual payment mode, the device, such as the smartphone, connects with the merchant site at block 220 establishing a real-time shopping experience wherein the merchant may provide real-time information at block 230 such as sales, rebates, and other promotional information. At block 240, an electronic fund transfer transaction is conducted and information relating to the virtual payment account is updated. The information relating to the virtual payment account is managed by the merchant who receives data associated with the electronic fund transaction such as the items purchased, the prices, rewards updates and other sales related information. Details of the electronic funds transfers utilizing the virtual payment account may be stored in the log. With the transaction being initiated at the merchant's electronic terminal 50, the underlying user account associated with the third party credit lender is engaged to complete the electronic fund transfer between the electronic payment medium issuer and the merchant's financial institution. The user's account associated with the electronic payment medium issuer is updated with the financial transaction details at block 250.

Figure 4:
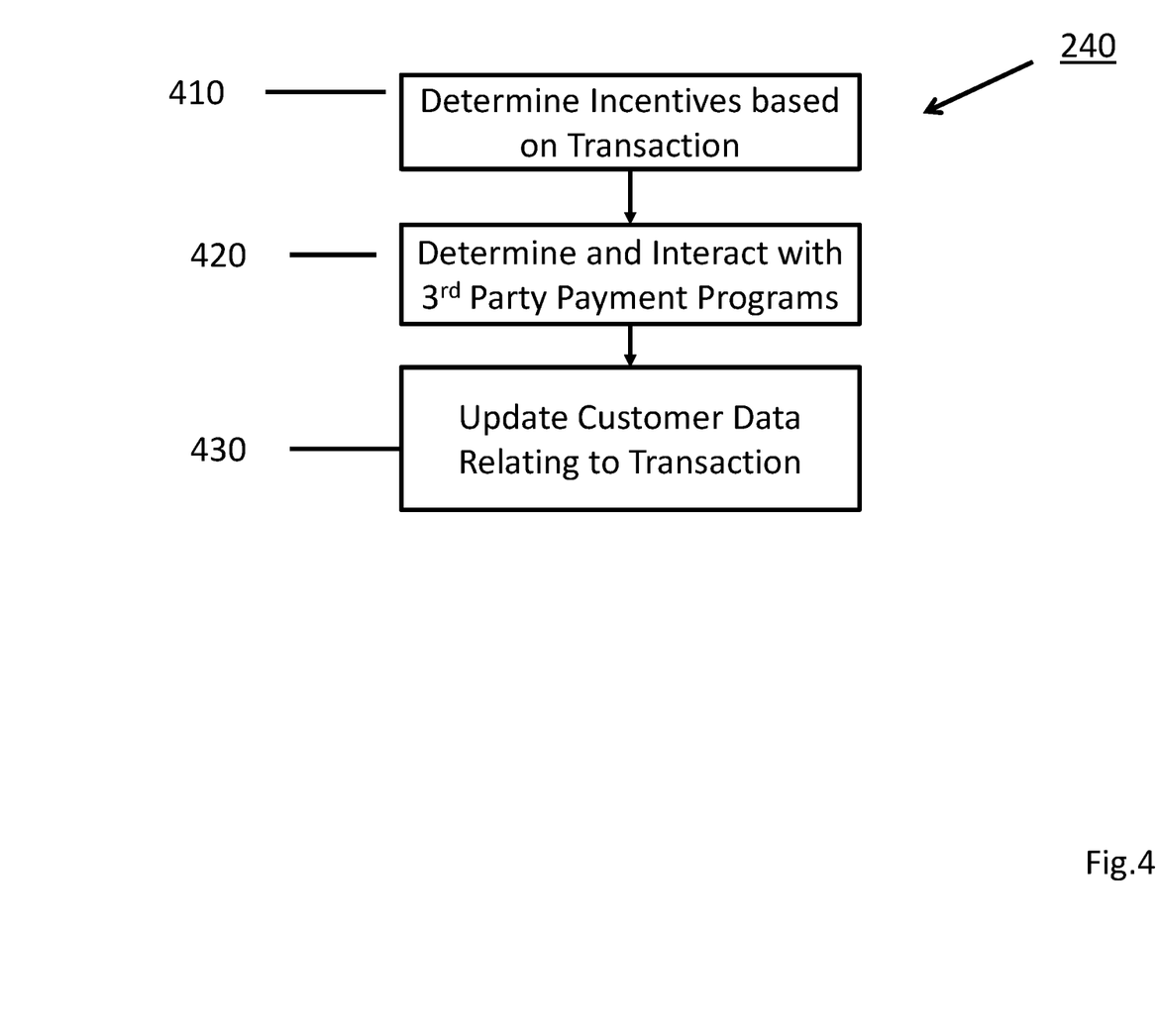
FIG. 4 illustrates a flow chart for obtaining information related to an electronic funds transfer for utilization in a virtual payment system according to one or more embodiments.

FIG. 4 illustrates steps associated with block 240 of FIG. 3 involving conducting the electronic fund transaction and updating the virtual payment account. At block 410, the virtual payment account gathers information relating to the transaction. From this information, marketing information including incentives for utilizing the virtual payment account may be provided to the consumer. The marketing information may include discounts, sales, rebates and merchant reward programs. Additionally, the virtual payment account may organize other payment methods specific to the merchant. For example, during a "buy three items and obtain a five dollar gift card" sale for the merchant, the gift card can be directly added to the virtual payment account specific to the merchant. In another example, the user can purchase a gift card for the merchant, and directly add the gift card to the virtual payment account specific to the merchant. At block 420, the virtual payment account may interact with third party host sites relating to items being purchased and the transaction details are utilized by the virtual payment account to determine if additional rebates are offered by third parties. At block 430, customer data relating to the transaction are updated. This information is retained by the merchant and identifies the purchasing habits of the consumer which may be utilized for future sales solicitations such as emails identifying that a particular item which the consumer has purchased previously is on sale and other targeted marketing materials.

In operation, the virtual payment account enables business lacking the resources to provide their own electronic payment medium such as a merchant credit card to provide a virtual merchant credit card. The virtual payment account functions as a merchant template on a consumer device for interacting with a consumer in providing merchant based incentives for transacting business with the merchant while interfacing with a third party electronic payment medium issuer for completing an electronic fund transaction. In an additional embodiment, the third party electronic payment medium issuer may provide direct incentives to the merchant for associating their virtual payment account with the third party electronic payment medium issuer. For instance, if the electronic payment medium issuer would offer a consumer an incentive of a cash back rewards program for utilizing the electronic payment medium, the electronic payment medium issuer may offer a similar incentive to the merchant for enticing the merchant utilize the respective electronic payment medium as the medium of choice for the particular merchant. When an electronic fund transaction is conducted, the merchant is engaged in the process and may accumulate data for subsequent marketing efforts and also interface the transaction with other reward programs offered by the merchant.

Figure 5:
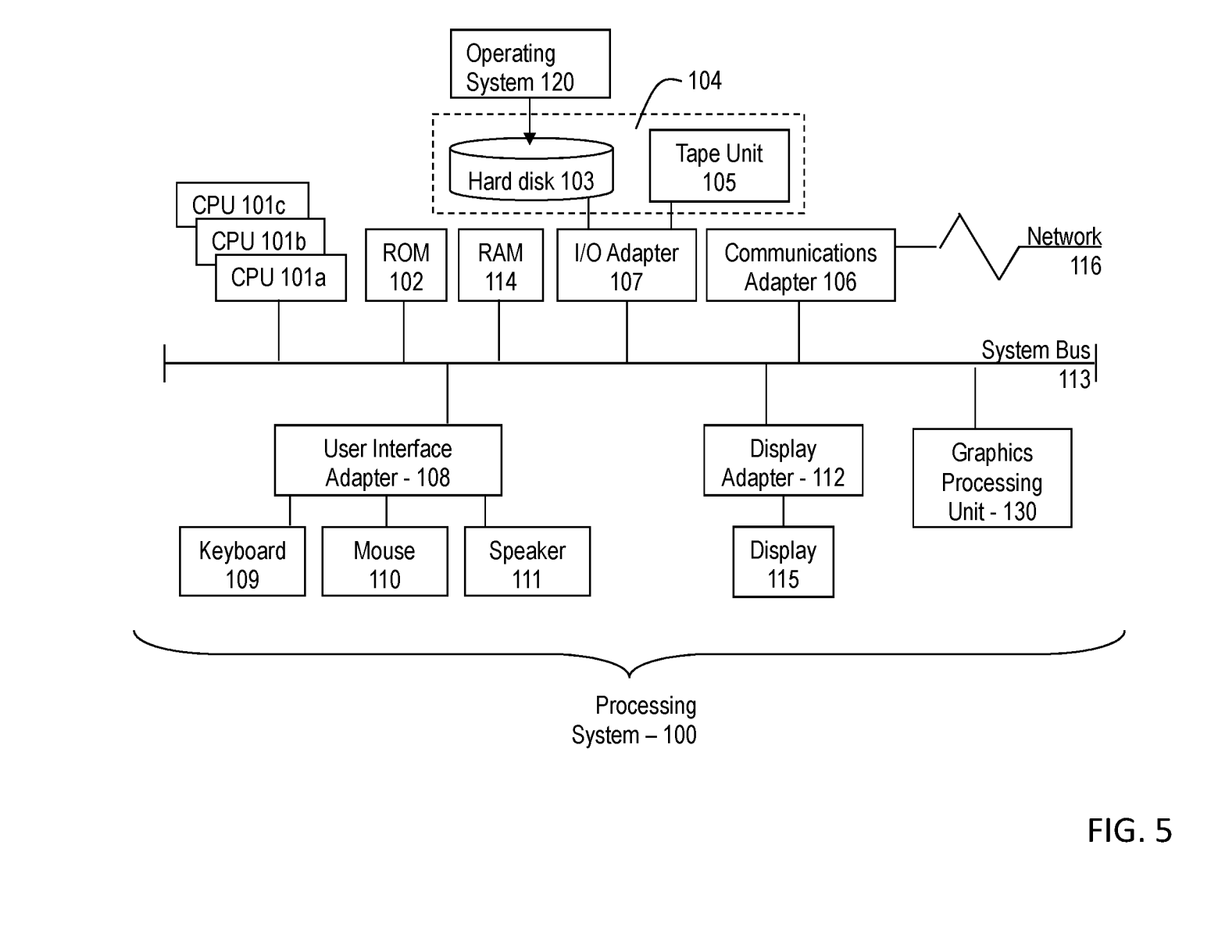
FIG. 5 shows a computer system according to an embodiment.

Referring to FIG. 5, there is shown electronic payment management system 100 according to one or more embodiments. First computing device 160 may have the same configuration as electronic payment management system 100. The electronic payment management system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 5 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling log management system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 5, the processing system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically identified device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, micro-identifier, firmware instructions, state-setting data, or either source identifier or object identifier written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for performing an electronic funds transfer, the method comprising:
obtaining, using a processor system of a mobile apparatus of a user, a virtual payment account associated with a merchant, the virtual payment account being associated with a consumer credit account of the user, wherein an electronic payment medium issuer is a third party providing commercial credit funding on behalf of the user, wherein the mobile apparatus includes a display, an input, a memory, a global positioning system (GPS) configured to generate information related to a current location of the mobile apparatus and the processor, and at least one application computer program installed on the mobile apparatus for querying a user via the display to provide details of the electronic funds transfer via the input for transmission to the virtual payment account host site wherein the details are selected from a group comprising: price of items subject to the electronic funds transfer, type of items subject to the electronic funds transfer, manufacturer of items subject to the electronic funds transfer, wherein the application computer program is configured to provide, via the display, a merchant template that allows the virtual payment account to function as a store issued credit card;
connecting, using the processor system, to a host site of the merchant, based on the user's engagement of a commercial transaction with the merchant using the mobile apparatus;
obtaining, from the merchant host site and using the processor system, any merchant-based incentives based on using the virtual payment account;
displaying the merchant-based incentives to the user via the display of the mobile apparatus;
connecting, at the time of purchase and using the processor system, to a host site of a third party related to the items being purchased, wherein the third party is a manufacturer of at least one of the items being purchased;
receiving from the third party host site and displaying to the user via the display, any third party-based incentives for purchasing the at least one of the items being purchased, wherein the items being purchased are the subject of the electronic funds transfer, wherein the third party-based incentives are in addition to the merchant-based incentives;
conducting an electronic funds transfer utilizing an electronic payment medium signature associated with the electronic payment medium provided by the virtual payment account interfacing with an electronic terminal associated with the merchant, and wherein information received from the merchant host site and the third party host site are managed by the merchant; and
updating the virtual payment account and consumer credit account with information relating to the electronic funds transfer, wherein the issuer provides incentives to both the user and the merchant for using the virtual payment account.

2. The computer-implemented method of claim 1, further including tendering payment via the device utilizing the virtual payment account via near field communication technology or contactless technology.

3. The computer-implemented method of claim 1, wherein the memory of the device stores at least one application computer program configured for controlling the processor for initiating the electronic funds transfer utilizing the virtual payment account.

4. The computer-implemented method of claim 1, wherein the marketing information is selected from a group comprising: sales information, rebates, discounts, merchant reward programs.

5. The computer-implemented method of claim 1, wherein the virtual payment account is in electronic communication with a third party site hosted by a third party providing information relating to incentives associated with a consumer transaction associated with the electronic funds transfer.

6. The computer-implemented method of claim 1, wherein the virtual payment account is administered by the merchant, the merchant having access to transactional information associated with the virtual payment account.

7. The computer-implemented method of claim 1, wherein the virtual payment account evaluates rules associated with the virtual payment account relating to the electronic funds transfer medium for determining if the electronic fund transfer is within the rules.

8. The computer-implemented method of claim 7, wherein the rules associated with the virtual payment account relating to the electronic funds transfer mediums are selected from a group comprising: maximum spending limits, types of items available for purchase, and time period for allowed purchases.

9. The computer-implemented method of claim 1, further including recording details of a plurality of electronic funds transfers utilizing the virtual payment account in a log.

10. A system for an electronic funds transfer involving a purchase, the system comprising:
a memory comprising computer readable instructions; and
a processing device of a mobile apparatus of a user for executing the computer readable instructions, the computer readable instructions causing the processing device to perform a method comprising:
obtaining a virtual payment account associated with a merchant, the virtual payment account being associated with a consumer credit account of the user wherein an electronic payment medium issuer is a third party providing commercial credit funding on behalf of the user;
connecting, using a processor system, to a host site of the merchant, based on the user's engagement of a commercial transaction with the merchant using the mobile apparatus;
obtaining, from the merchant host site, any merchant-based incentives based on using the virtual payment account;
connecting, at the time of purchase, to a host site of a third party related to the items being purchased, wherein the third party is a manufacturer of at least one of the items being purchased;
conducting an electronic funds transfer utilizing an electronic payment medium signature associated with the electronic payment medium provided by the virtual payment account interfacing with an electronic terminal associated with the merchant, and wherein information received from the merchant host site and the third party host site are managed by the merchant; and receiving from the third party host site and displaying to the user via a display, any third party-based incentives for purchasing the at least one the items being purchased, wherein the items being purchased are the subject of the electronic funds transfer, wherein the third party-based incentives are in addition to the merchant-based incentives;

updating the virtual payment account and consumer credit account with information relating to the electronic funds transfer, wherein the issuer provides incentives to both the user and the merchant for using the virtual payment account, wherein the mobile apparatus includes the display, an input, a memory, a global positioning system (GPS) configured to generate information related to a current location of the mobile apparatus and the processor, and at least one application computer program installed on the mobile apparatus for querying a user via the display to provide details of the electronic funds transfer via the input for transmission to the virtual payment account host site, wherein the details are selected from a group comprising: price of items subject to the electronic funds transfer, type of items subject to the electronic funds transfer, manufacturer of items subject to the electronic funds transfer wherein the application computer program is configured to provide, via the display, a merchant template that allows the virtual payment account to function as a store issued credit card.

11. The system of claim 10, including a user device having a user device processor and a user device memory in electrical communication with the user device processor and at least one application computer program stored in the user device memory configured for controlling the user device processor for conducting an electronic funds transfer and transferring information relating to the purchase associated with the electronic funds transfer to the virtual payment account.

12. The system of claim 11, wherein the user device is a mobile smartphone which includes a display, the at least one application computer program querying a user via the display to associate a name for the purchase which is associated with the electronic funds transfer.

13. The system of claim 10, including a merchant host site providing incentive information associated with the merchant, the incentive information relating to the purchase associated with the electronic funds transfer.

14. A computer program product for an electronic funds transfer, the computer program product comprising a computer readable storage medium having program instructions embodied therewith, wherein the computer readable storage medium is not a transitory signal per se, the program instructions readable by a processing circuit to cause the processing circuit to perform a method comprising:

obtaining, using a processor system of a mobile apparatus of a user, a virtual payment account associated with a merchant, the virtual payment account being associated with a consumer credit account of the user, wherein an electronic payment medium issuer is a third party providing commercial credit funding on behalf of the user, wherein the mobile apparatus includes a display, an input, a memory, a global positioning system (GPS) configured to generate information related to a current location of the mobile apparatus and the processor, and at least one application computer program installed in the mobile apparatus for querying a user via the display to provide details of the electronic funds transfer via the input for transmission to the virtual payment account host site wherein the details are selected from a group comprising: price of items subject to the electronic funds transfer, type of items subject to the electronic funds transfer, manufacturer of items subject to the electronic funds transfer, wherein the application computer program is configured to provide, via the display, a merchant template that allows the virtual payment account to function as a store issued credit card;

connecting, using a processor system, to host site of the merchant, based on the user's engagement of a commercial transaction with the merchant using the mobile apparatus;

obtaining, from the merchant host site and using the processor system, any merchant-based incentives based on using the virtual payment account;

connecting, at the time of purchase and using the processor system, to host site of a third party related to the items being purchased, wherein the third party is a manufacturer of at least one of the items being purchased;

receiving from the third party host site and displaying to the user via the display, any third party-based incentives for purchasing the at least one of the items being purchased, wherein the items being purchased are the subject of the electronic funds transfer, wherein the third party-based incentives are in addition to the merchant-based incentives;

conducting an electronic funds transfer utilizing an electronic payment medium signature associated with the electronic payment medium provided by the virtual payment account interfacing with an electronic terminal associated with the merchant, and wherein information received from the merchant host site and the third party host site are managed by the merchant; and updating the virtual payment account and consumer credit account with information relating to the electronic funds transfer, wherein the issuer provides incentives to both the user and the merchant for using the virtual payment account.

15. The computer program product of claim 14, wherein the mobile apparatus comprises a processor and a memory in data communication with the processor, wherein the memory stores at least one application computer program configured for controlling the processor for providing information related to the electronic funds transfer to the virtual payment account.

16. The computer program product of claim 14, wherein the marketing information relating to the merchant is provided by a merchant host site in electrical communication with the device.

17. The computer program product of claim 14 wherein the step of conducting the electronic transfer includes determining a price of an associated consumer transaction, the price of the associated consumer transaction being manipulated by incentives associated with the consumer transaction offered by the merchant associated with the virtual payment account.

18. The computer-implemented method of claim 5, wherein the step of conducting the electronic transfer includes determining a price of the associated consumer transaction, the price of the associated consumer transaction being manipulated by incentives associated with the consumer transaction offered by the merchant associated with the virtual payment account.

* * * * *